United States Patent
Arunapuram et al.

(10) Patent No.: US 11,442,859 B2
(45) Date of Patent: Sep. 13, 2022

(54) MULTIPLE CACHE FRAMEWORK FOR MANAGING DATA FOR SCENARIO PLANNING

(71) Applicant: Oracle International Corporation, Redwood Shores, CA (US)

(72) Inventors: Sundararajan Arunapuram, West Chester, PA (US); Ramkumar Ramachandran, Chester Springs, PA (US); Sai Rajesh Mahabhashyam, Irving, TX (US); Shallav Varma, Conshohocken, PA (US)

(73) Assignee: Oracle International Corporation, Redwood Shores, CA (US)

( * ) Notice: Subject to any disclaimer, the term of this patent is extended or adjusted under 35 U.S.C. 154(b) by 905 days.

(21) Appl. No.: 16/255,585

(22) Filed: Jan. 23, 2019

(65) Prior Publication Data
US 2020/0233802 A1    Jul. 23, 2020

(51) Int. Cl.
G06F 12/00    (2006.01)
G06F 12/084    (2016.01)

(52) U.S. Cl.
CPC ...... *G06F 12/084* (2013.01); *G06F 2212/622* (2013.01)

(58) Field of Classification Search
CPC ............ G06Q 10/08355; G06F 12/084; G06F 2212/622
See application file for complete search history.

(56) References Cited

U.S. PATENT DOCUMENTS

2020/0364143 A1* 11/2020 Garvey ................ G06Q 10/105

* cited by examiner

*Primary Examiner* — Arvind Talukdar
(74) *Attorney, Agent, or Firm* — Invoke

(57) ABSTRACT

The embodiments disclosed herein relate to computing a transportation plan for transporting goods from one place to another across a number of shipments and that satisfy multiple shipment orders. The transportation plan may specify a transportation channel that includes one or more segments selected from service provider rate offerings that may include a means of transportation, starting location, destination location, and cost of the segment. An actionable transportation plan may be computed based on current transportation planning data. Alternative plans may be computed for a variety of scenarios in which hypothetical changes are introduced to the transportation planning data. Any combination of an actionable transportation plan and alternative plans may be computed concurrently with computations sharing a common cache of production data.

12 Claims, 6 Drawing Sheets

MULTIPLE CACHE FRAMEWORK FOR MANAGING DATA FOR SCENARIO PLANNING

TECHNICAL FIELD

The present disclosure relates to data cache management. Specifically cached data representing transportation planning data are managed to efficiently perform alternative scenario planning.

BACKGROUND

A transportation plan may involve determining a list of shipments for transporting goods from a source location to a destination location. The transportation plan may identify one or more transportation segments selected from a list of rate offerings. A rate offering may include a service provider (e.g. DHL, Fedex, Cargolux, Union Pacific), a means of transportation (e.g. truck, air, train), a starting and destination location, and cost of the segment. For example, to deliver a package from Santa Clara, Calif. to Amesbury, Mass., one option may be to use Fedex end-to-end. Another option may be to use a trucking company to deliver to San Jose airport, an air freight company to carry the package from San Jose Airport to Boston Airport, and a courier to pick up the package at Boston Airport and deliver the package to the address in Amesbury. Each of these three segments has an associated cost, and the cost associated with a transportation plan may include the sum of the cost of the segments.

Contingency planning may involve determining an alternate transportation plan if the rate offerings change. A change may be temporary, such as weather related delays or cancellations, or a change may be permanent such an increase in price of a segment.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
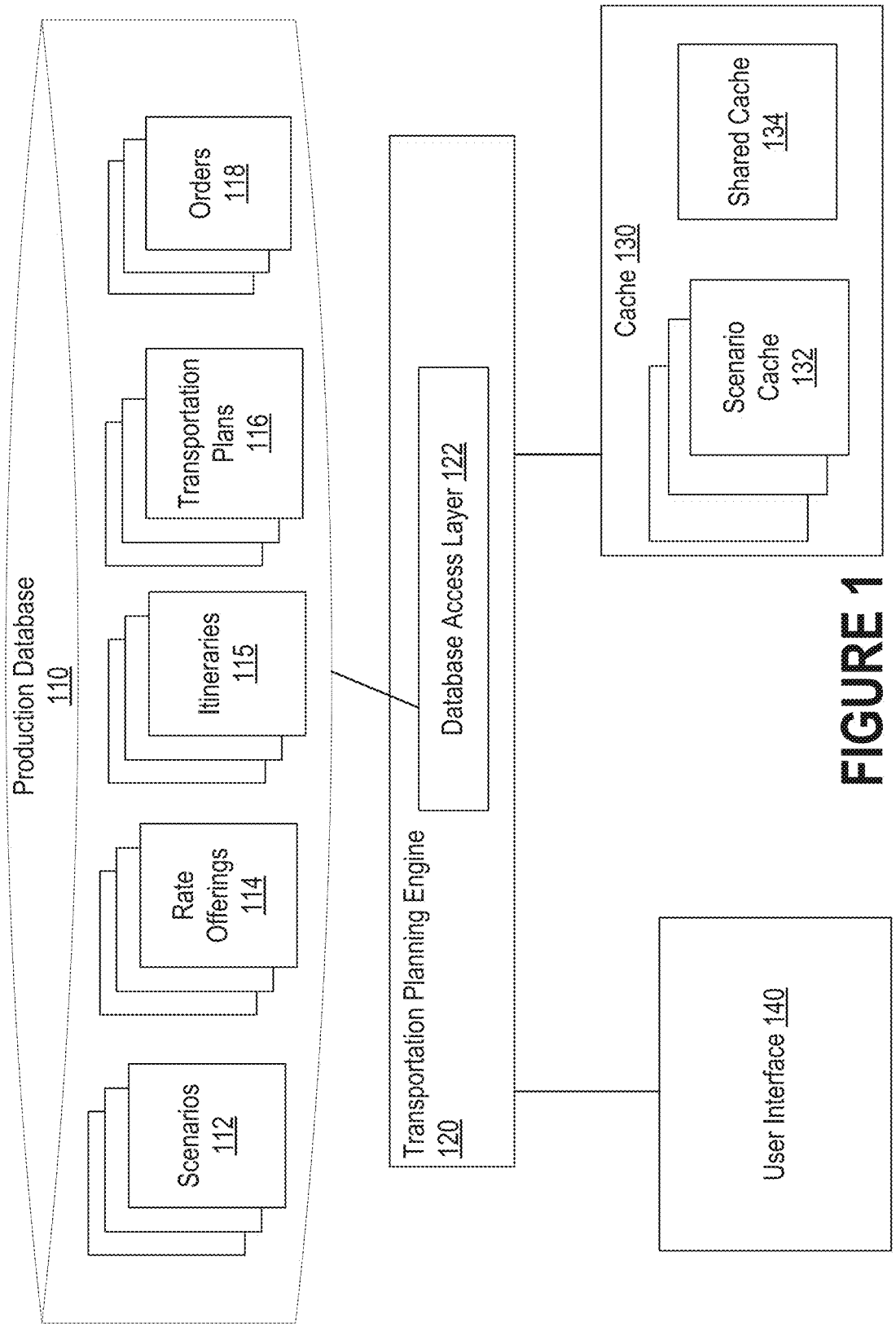
FIG. 1 is a block diagram that illustrates components of a transportation planning system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. Introduction

A transportation plan specifies how to transport goods from one place to another. A person or company may create a service order that requests the transport of goods. The plan may include constraints on the transport such as shipping methods (e.g. barge, truck, train, air, bus etc.), latest arrival date, or cost. A single transportation plan may transport goods from multiple service orders. A transportation plan may include multiple contiguous shipments. Each shipment transports a set of goods from a starting location to a ending location, and shipment A and shipment B are contiguous when the starting location for B is the same as the ending location of A. For example, shipment A may include shipping goods by barge from Hong Kong, to Oakland, Calif. Shipment B may include trucking the goods from the port of Oakland to Oakland Airport. Shipment C may include air freight to Atlanta, Ga., etc. Segments specified by a transportation plan may be provided by different service providers using different shipping methods. As a simple example, Company A wants 100 widgets delivered from Chicago to Philadelphia. Company B wants 300 packages delivered from New York to Philadelphia. A transportation plan may specify a shipment of 100 widgets from Chicago to New York, and the 100 widgets and the 300 packages together shipped from New York to Philadelphia.

A scenario is a simulation of a change in behavior of the system. For example, a scenario might explore the effect on the transportation plan if a service provider were to increase the rate by 10% on a particular segment. Another scenario might observe the effect on the transportation plan if one of the ports in the transportation network were to close due to unforeseen conditions. Specifically, the scenario may observe how orders would be re-routed through the network and observing the cost of this routing change. A network modeling tool may provide an easy way to define these scenarios and simulate a plan with those changes. The changes required for the plan are made in memory and stored in scenario caches.

Creating such a transportation plan may be very complex, having to satisfy different constraints from different service orders. Creating the transportation plan also aims to select, from a myriad of service provider rate offerings, those offerings that optimize for some aspect such as time or cost. Augmenting a production transportation planning system to anticipate the effect of changes to inputs to a transportation plan, such as changes to rate offerings, orders, or available itineraries, may add significantly to the complexity of the system. One way to add what-if scenario planning to a production system may involve replicating and persisting large amounts of data for each what-if scenario, thus making the process very difficult and time consuming. Another way is to enhance the production transportation planning system itself to support scenario planning using the same production database as for production planning, as described herein.

2. General Overview

A transportation planning system computes (a) a production transportation plan based on operational production data and (b) alternate transportation plans based on a variety of scenarios corresponding to hypothetical values for the production data. The production data is represented by a set of objects that may be stored in a shared cache of production data. A production transportation plan may be computed based on the values of the objects stored in the shared cache of production data.

An alternate transportation plan may be computed based on values of objects stored in (a) the shared cache of production data, and (b) a private cache of scenario data. The private cache of scenario data stores alternate versions of a subset of the set of objects stored in the shared cache of production data. The transportation planning system picks and chooses objects from the shared cache of production data and the private cache of scenario data to generate an alternate transportation plan. Specifically, the transportation planning system prioritizes the alternate versions of objects stored in the private cache of scenario data over the versions of objects stored in the shared cache of production data. A version of an object stored in the private cache of scenario data is selected when versions of the object are stored in both the shared cache of production data and the private cache of scenario data. A version of an object stored in the shared cache of production data is used when no version of the same object is stored in the private cache of scenario data corresponding to the particular alternate plan being computed by the transportation planning system.

During the scenario planning process, the optimizer accesses several types of production data objects. Each such object might reference other production objects, which may also have changed. Given the complexity of the object model, the scenario planner must recognize the data changes of an object not only at its root, but also all its referenced objects.

3. Transportation Planning System Architecture

FIG. 1 is a block diagram that illustrates components of a transportation planning system that supports scenario planning, in accordance with one or more embodiments. Components may be added, removed, modified, or combined. Functionality described in relation to one component may instead be implemented by another component. Accordingly, the specific components illustrated and/or described herein should not be construed as limiting the scope of any of the claims.

The transportation planning system comprises Production Database 110, Transportation Planning Engine 120, Cache 130, and User Interface 140.

Production Database 110 comprises Scenarios 112, Rate offerings 114, Itineraries 115, Transportation Plans 116, and Orders 118, and many other datasets not explicitly illustrated here. Orders 118 stores one or more requests, referred to herein as "service orders", to transport goods from one place to another. In an embodiment, one transportation plan may satisfy the transport requests from multiple service orders. The type of goods specified in the order may place constraints on shipments selected for their transport. For example, goods might be very fragile requiring special handling, very valuable requiring insurance and tracking, hazardous such that they are not allowed to be transported by certain modes of transportation, or perishable requiring freezing or refrigeration in transport. An order may also constrain the overall cost for satisfying the shipping request or may specify an amount of time by which the goods must reach their destination. Each of these attributes of the goods and requirements of the request may be considered when forming the transportation plan.

Rate offerings 114 is a set of options for shipping goods between two endpoints. Each service provider has a rate offering that may include multiple rate options. Each rate option in a rate offering may include origination and delivery locations, transit time, means of transportation, and cost per distance and/or per unit of goods being shipped. Descriptions of the means of transportation may include options such as refrigeration, fragile handling, ability to handle hazardous material, etc. There may be a differentiation in the cost depending on the transportation options selected. The rate offerings in the production database reflect the options that are available at the time a production transportation plan is generated, and a production transportation plan may be created based on the production rate offerings to fulfil a set of production orders.

Itineraries 115 provides routing information between a source and a destination. Some routes will be direct routes with no intervening stops (i.e. one leg). Other routes will have a set of legs with a stop between each leg of the route. When delivering goods on a route with multiple legs, selecting a rate option for a leg of the route may be determined independently of other legs in the route. The itinerary may also include an indication of rate options across service providers for each direct route.

Transportation Plans 116 stores transportation plans that have been computed for a set of orders stored in orders 118. The transportation plans may be stored in the production database without overwriting or changing other data already stored in the production database.

Scenarios 112 stores one or more what-if scenario specifications in which certain attributes of data used by the transportation planning engine 120 are changed to see how a transportation plan for a set of orders may be affected. For example, a scenario could include changing the price of a particular rate option or removing options such as the availability of refrigeration, or changing the transit time. A scenario may be created that changes an order, such as changing the source or the destination of the desired shipment, the amount of goods, or constraints on the total transit time or transportation types used. Itinerary changes may change connection locations or remove an indication that a particular rate option is available for a leg of the itinerary. Any source of data used by the transportation engine may be changed and included in a scenario to understand the impact of such a change on the transportation plan.

The scenarios do not change the values of production data stored in the production database. An actionable production transportation plan may be computed against the production data concurrently with computing an alternate transportation plan for a scenario that may not be actionable because the data is modified for a hypothetical scenario and does not necessarily reflect options currently available in the real world.

Cache 130 comprises Scenario Cache 132 and Shared Cache 134. Shared Cache 134 comprises an in-memory cache that stores immutable object representations of data retrieved from the production database. In an embodiment, the production database may be a relational database. When data from the database is requested, if there is not an object for the requested data in the shared cache, the data may be read from the database, an object created for the data, and the object stored in the shared cache.

Scenario Cache 132 is a set of scenario caches. Each scenario cache is an in-memory cache that stores objects for a particular scenario in Scenarios 112. The objects stored in a scenario cache are copies of objects that represent certain production data, but according to the respective scenario specification, the copies of the objects in the scenario cache have a different value from the same object in the shared cache or the corresponding data stored persistently in the database.

Transportation Planning Engine 120 computes a transportation plan for a set of service orders using the transportation planning data, and stores the resulting transportation plan in transportation plans 116. Transportation Planning Engine 120 comprises Data Access Layer 122. Data access layer 122 takes at least an object identifier as input and returns an object corresponding to the object identifier. Copies of an object with a particular identifier may be stored in the persistent database and/or the shared cache and the scenario cache. Data access layer 122 determines where copies of objects having the object identifier are stored, and determines which copy of the object to return.

The transportation planning engine does not change any existing production data in the database. Changes to production transportation planning data may be made through a separate administrative interface. For example, when a service provider changes the service provider's rate offering, the data in the production database is updated to reflect the change. In an embodiment, changes made to the database may not change the value of objects currently in the shared cache. In an embodiment, changes made to an object in the database may be postponed while there is a copy of the object in the shared cache.

Figure 3A:
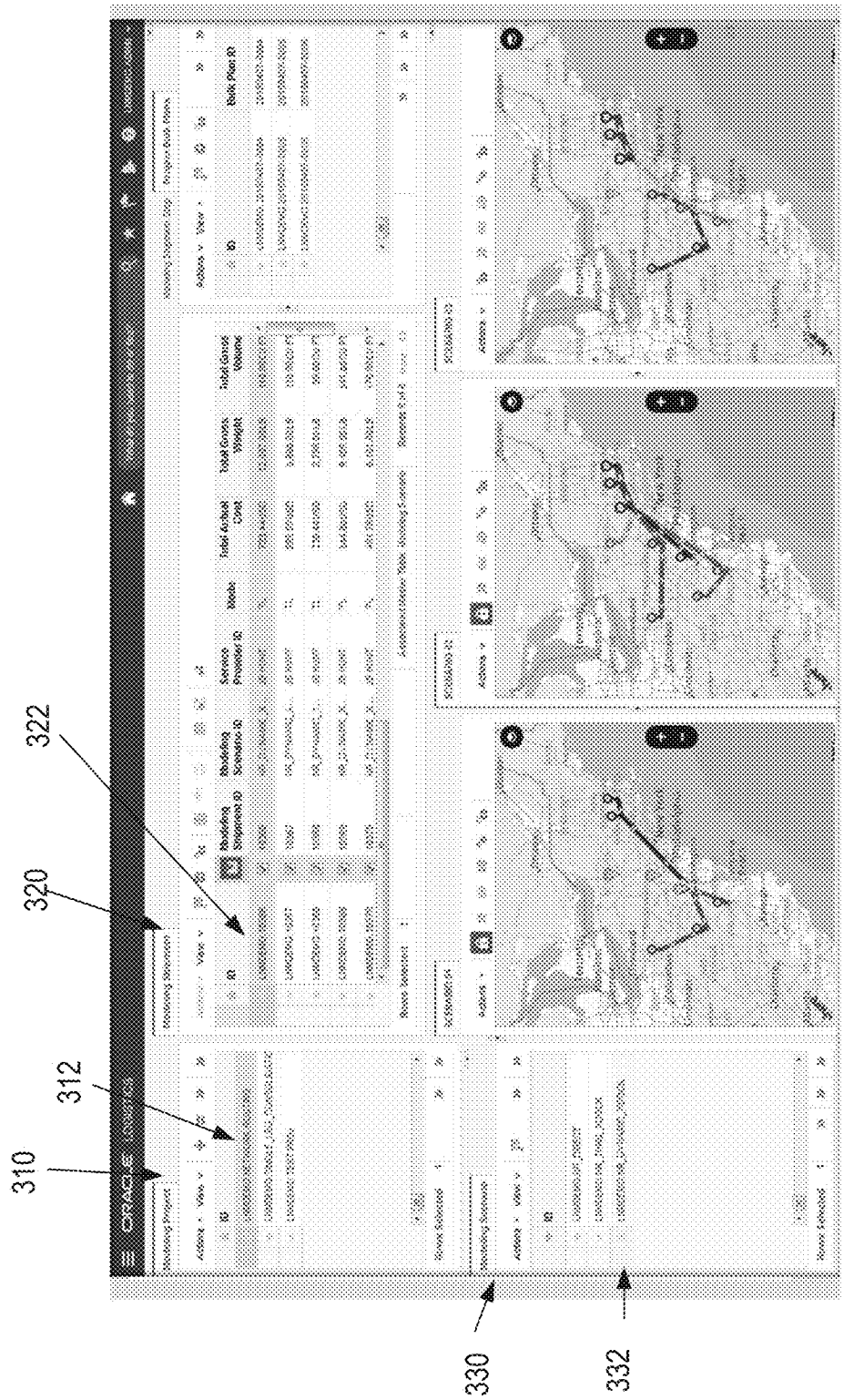
FIG. 3A illustrates an example user interface for a portion of a transportation planning tool that creates a transportation plan, in accordance with one or more embodiments.

User Interface 140 may be used by a user to initiate a process for computing a transportation plan. User interface 140 may be presented by a transportation planning tool. In an embodiment, the user interface may also allow a user to enter orders, specify scenarios, enter or change rate offerings, add itineraries, and/or view, analyze, and compare alternative transportation plans created for the same orders under different scenarios. FIG. 3A illustrates an example user interface for a portion of a transportation planning tool that creates a transportation plan, in accordance with one or more embodiments. In the example of FIG. 3A, the modeling project pane 310 shows three projects, each of which may comprise multiple scenarios. Project LNMDEMO.NETWORK ROUTING (312) is selected, and the other panes of the tool illustrate information for that project. Modeling Scenario pane 330 illustrates three distinct scenarios for the selected project, LNMDEMO.NETWORK ROUTING. The maps to the right of the modeling scenario 330 illustrate the effect on routing corresponding to each of the three scenarios. Of the three scenarios, LNMDEMO.NR_DYNAMIC_XDOCK (332) is selected. Each line (322) in the Modeling Shipment pane 320 represents one segment of a transportation plan generated for satisfying a set of service orders using the selected scenario 332. The Modeling Shipment pane 320 includes a service provider, for example JB Hunt, and a transportation mode, for example "TL" that stands for truckload and is used when renting the entire truck. Other transportation modes may include Less Than Truck Load ("LTL") in which the truck is shared with other loads, "PARCEL" in which a package is sent via postage carrier such as USPS, UPS, FEDEX, etc., "VOYAGE" (barge or ship), and "AIR."

Figure 3B:
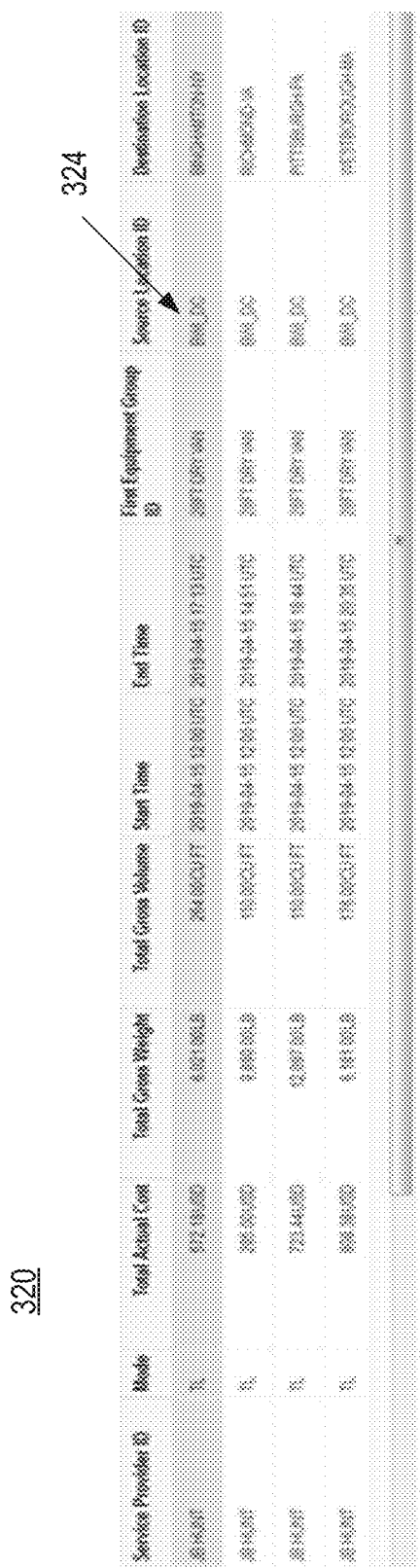
FIG. 3B illustrates another example transportation plan that shows more of the columns than shown in the screen shot in FIG. 3A, in accordance with one or more embodiments.

FIG. 3B illustrates another example transportation plan that shows more of the columns than shown in the screen shot in FIG. 3A. Notably, FIG. 3B illustrates the source and destination for each shipment. For example, the first shipment (324) in the Modeling Shipment pane 320 is a shipment from Baltimore Washington International Airport to Binghamton, N.Y.

Figure 4:
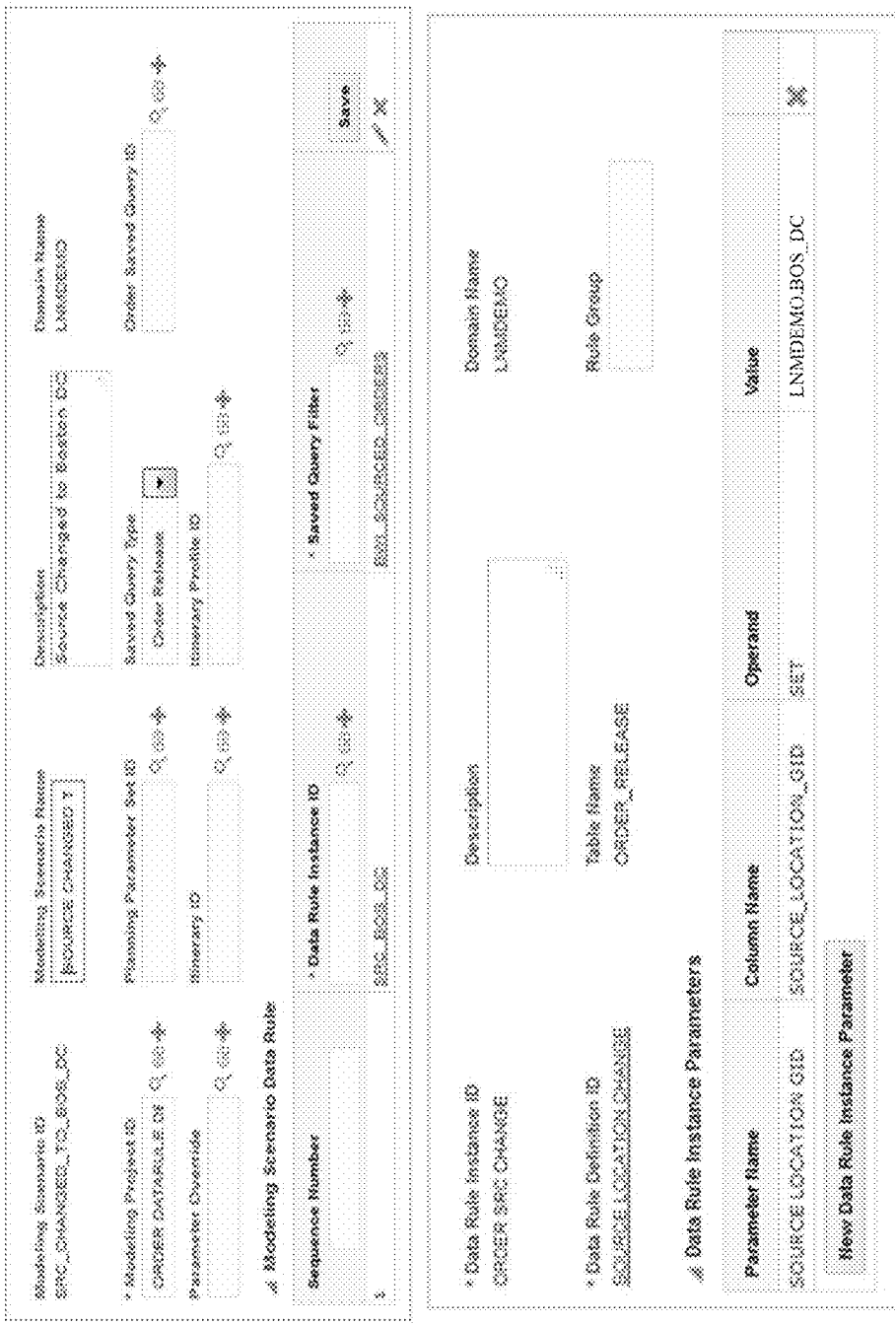
FIG. 4 illustrates a user interface for defining a scenario, in accordance with one or more embodiments.

FIG. 4 illustrates a user interface for a portion of a transportation planning tool used to define scenarios, in accordance with one or more embodiments. In the example of FIG. 4, a scenario is being created that changes a service order in which the source location of the shipment is changed. In this example, the production order was to ship from Baltimore to Philadelphia, and the scenario changes the order to ship from Boston to Philadelphia instead of from Baltimore. A user interface may be provided for each data set that is used by the transportation engine that allows a scenario planner to change a portion of the dataset for inclusion in a scenario.

4. Generating Alternate Scenario Plans

Figure 2:
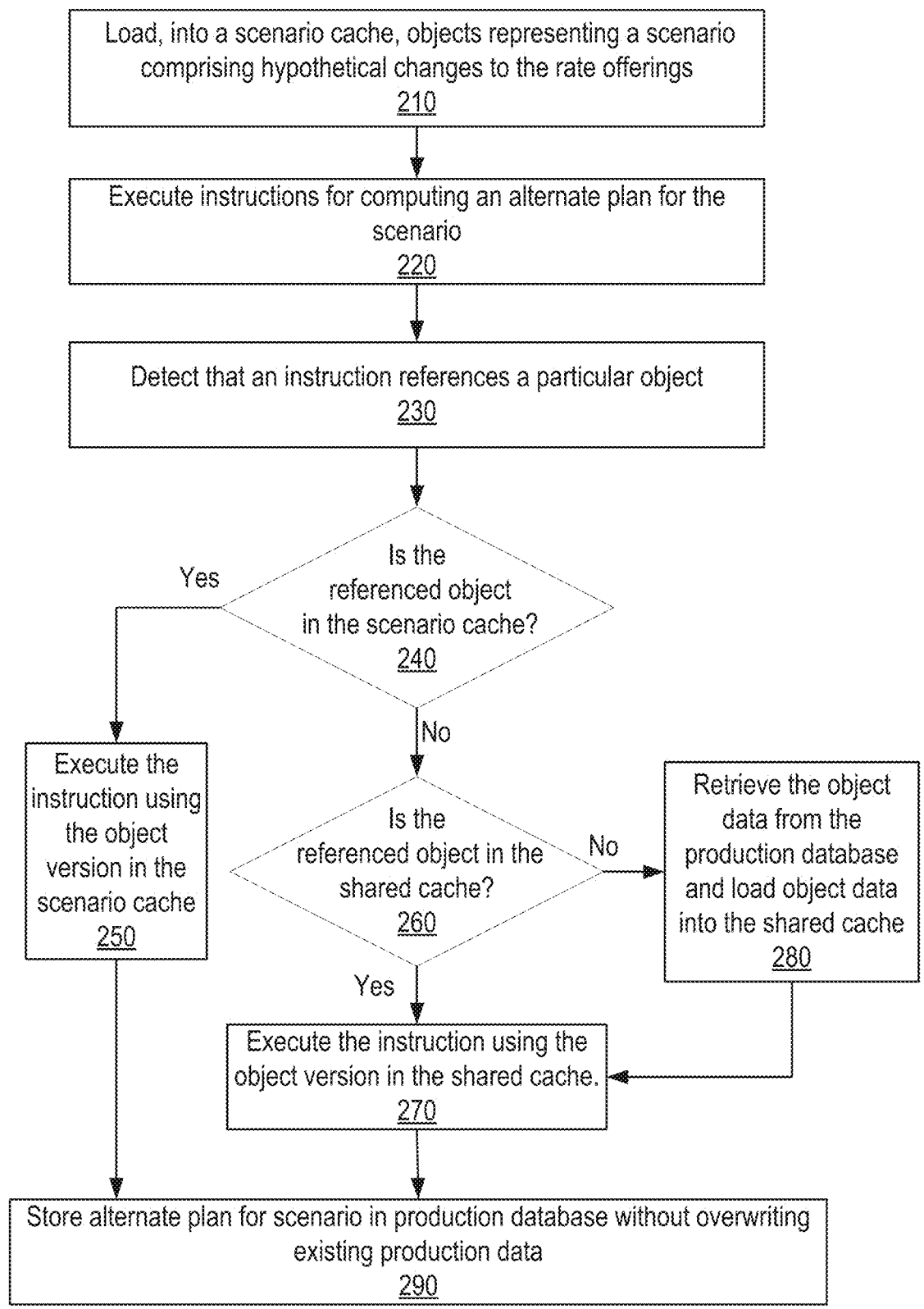
FIG. 2 is a flow diagram that illustrates using a scenario cache to compute an alternate transportation plan according to potential changes in transportation planning data, in accordance with one or more embodiments.

FIG. 2 is a flow diagram that illustrates using a scenario cache to compute an alternate transportation plan according to potential changes in transportation planning data, in accordance with one or more embodiments.

Computing an alternate transportation plan for a particular scenario (in scenarios 112) comprises loading the respective scenario cache (in scenario cache 132) with copies of transportation planning objects with their values changed as specified by the particular scenario (Operation 210). In the embodiment illustrated by FIG. 2, before the computation of the alternate transportation plan starts, the set of objects having changes to their values is defined along with the rules that describe the changes to that set of objects. Once the transportation planning engine begins executing to generate an alternate transportation plan for a particular scenario, the objects needed by the particular scenario are registered and loaded into the scenario cache along with a set of rules describing the changes to the values of those registered objects. Each registered object may (a) be retrieved from the persistent database or the shared cache, (b) have its value changed according to the rules loaded for the particular scenario, and (c) the object as changed may be stored in the scenario cache.

If the production version of the object, whose value is to be modified for the scenario, is already stored in the shared cache, the scenario copy of the object may be created by copying the production version of the object from the shared cache and changing its value. If not already in the shared cache, the scenario version of the object may be created by (a) retrieving the object data from the production database, (b) converting the data into an in-memory object, (c) changing the value of the in-memory object, and (d) storing the scenario version of the object in the scenario cache. In an embodiment, the in-memory object created from the data retrieved from the database may be stored in the shared cache.

Once the scenario cache is loaded with copies of objects whose values are specified by the scenario, the transportation planning engine may begin to compute an alternate transportation plan for the scenario. (Operation 220) In an embodiment, the content of the scenario cache is immutable; that is, the values of transportation objects loaded into the scenario cache does not change during the computation of the alternate transportation plan for the scenario.

In Operation 230, an instruction executed by the transportation planning engine detects that the value of a particular object is required for the computation. The object identifier of the required object may be provided to the data access layer 122 for finding and returning the correct version of the corresponding object.

The data access layer determines whether an object with the specified object identifier is stored in the scenario cache (Operation 240). If the referenced object is registered for the scenario then the data access layer may retrieve the object from the scenario cache. If the object is a registered object, the flow proceeds to Operation 250. If the referenced object is not in the list of registered objects for the scenario, then the production version of the object may be used for the computation, and the flow proceeds to Operation 260.

If the object is found in the scenario cache, then the data access layer returns the version of the object from the scenario cache, and the instruction executed by transportation planning engine uses the content of the returned object for the computation (Operation 250). If the data access layer does not find the object in the scenario cache, then the access layer looks for an object with the required object identifier in the shared cache (Operation 260). If the data access layer finds the object in the shared cache, then the data access layer returns the version of the object from the shared cache, and the instruction executed by transportation planning engine uses the content of the returned object for the computation (Operation 270). If there is no object having the object identifier in the shared cache, the data access layer may (a) retrieve the corresponding data from the persistent database, (b) create a corresponding in-memory object in the shared cache having the object identifier (Operation 280), and (c) return the newly created in-memory object to be used by the transportation planning engine for the computation (Operation 270).

In Operation 290, when the computation of the alternate transportation plan for the scenario is completed, the transportation plan created by the computation may be stored in the persistent production database without changing values already stored in the database.

In another embodiment, the scenario cache may not be pre-loaded with objects. Instead, before the transportation engine begins execution to generate an alternate transportation plan, the scenario data and rules may be processed to determine which objects are used by the scenario, and these objects may be registered. The registered objects may be retrieved, modified, and stored in the scenario cache on demand during computation. In such an embodiment, when the data access layer receives an object identifier of an object needed by a computation, the list of registered objects may be consulted to determine whether the referenced object has a changed value for the scenario. If the referenced object is registered for the scenario, then the data access layer may attempt to retrieve the object from the scenario cache. The object may be in the scenario cache if previously accessed during the generation of this alternate transportation plan. If the object is in the scenario cache, the version in the scenario cache will be used for the computation. If not yet in the cache, then the data access layer may retrieve the production version of the object from the shared cache, modify the value of a copy of the production version of the object according to the scenario rules, store the modified copy of the object in the scenario cache, and use the newly stored scenario object for the computation.

A person of ordinary skill in the art understands how to implement a data cache and determine whether an object of a particular object id resides in the cache, database, or other repository. For example, in an embodiment, a single region of memory may be used for caching in memory objects. Each logical cache stored within the region of memory have an identifier, and an object may be located by searching for the object using a combination the object identifier and the cache identifier. In another embodiment, two separate regions of memory may be allocated: one region to store the shared cache, and the other region for the scenario caches to share. A cache identifier may first indicate in which region to search, then the cache identifier and the object identifier may be used to locate the desired object. Any implementation of caches and searching for objects in the cache may be used.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is labeled with a tenant ID. A tenant is permitted access to a particular network resource only if the tenant and the particular network resources are associated with a same tenant ID.

In an embodiment, each tenant is associated with a tenant ID. Each application, implemented by the computer network, is labeled with a tenant ID. Additionally or alternatively, each data structure and/or dataset, stored by the computer network, is labeled with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be labeled with a tenant ID. Only a tenant associated with the corresponding tenant ID may access data of a particular database. As another example, each entry in a database implemented by a multi-tenant computer network may be labeled with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
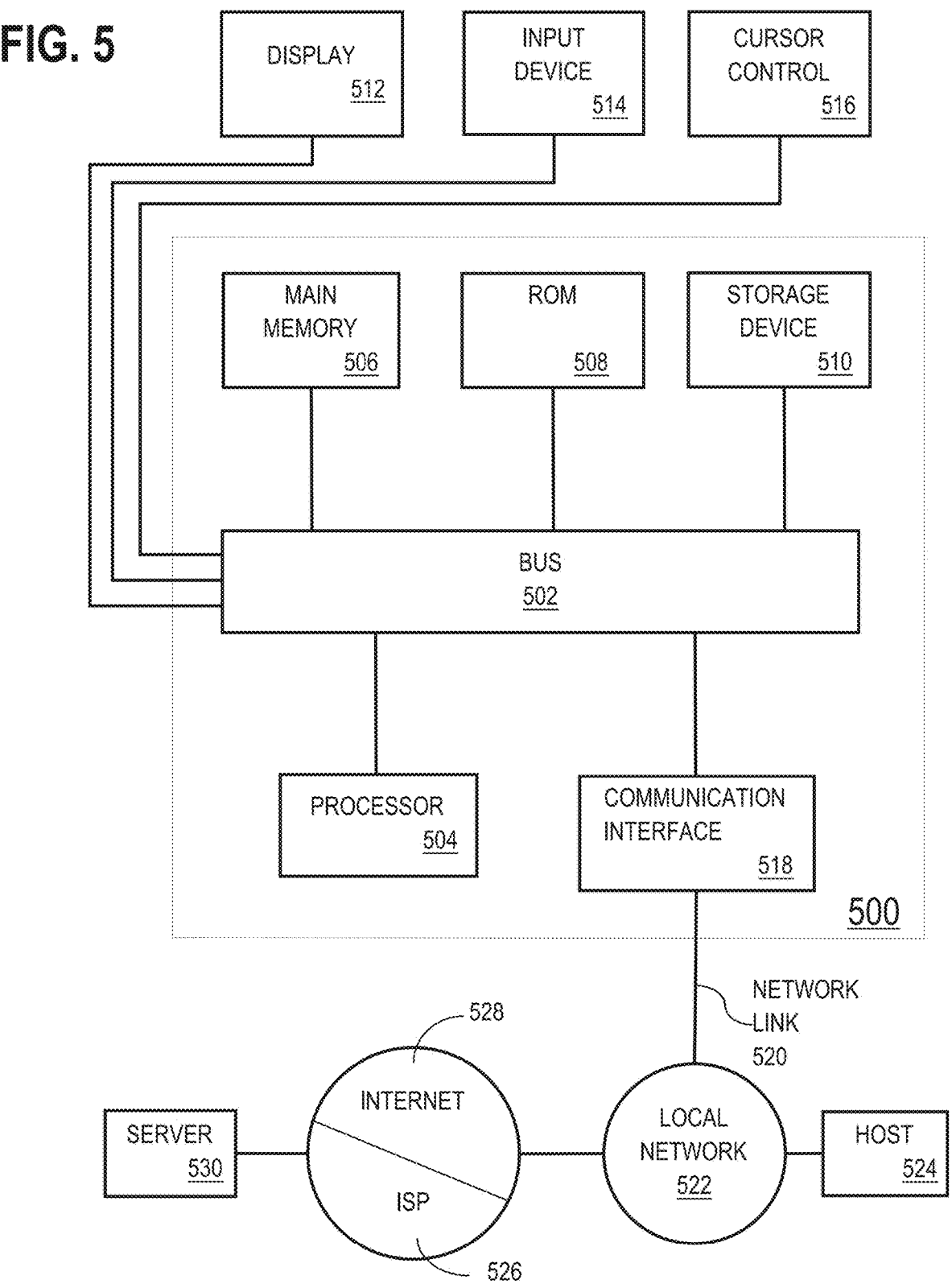
FIG. 5 shows a block diagram that illustrates a computer system, in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   computing an initial plan using objects stored in a shared cache, wherein computing the initial plan comprises executing instructions referencing a first object and a second object, wherein the instructions are executed based on (a) a first version of the first object and (b) a first version of the second object stored in the shared cache;
   computing a first alternate plan corresponding to a first scenario, wherein computing the first alternate plan comprises executing the instructions referencing the first object and the second object at least by:
      determining that a second version of the first object is stored in a first scenario cache, wherein versions of objects stored in the first scenario cache supersede versions of objects stored in the shared cache for computing the first alternative plan for the first scenario;
      determining that no version of the second object is stored in the first scenario cache; and
      executing the instructions to compute the first alternate plan based on (a) the second version of the first object stored in the first scenario cache and (b) the first version of the second object stored in the shared cache;
   computing a second alternate plan corresponding to a second scenario, wherein computing the second alternate plan comprises executing the instructions referencing the first object and the second object at least by:
      determining that a second version of the second object is stored in a second scenario cache, wherein versions of objects stored in the second scenario cache supersede versions of objects stored in the shared cache for computing the second alternate plan for the second scenario; and
      executing the instructions to compute the second alternate plan based on (a) the second version of the second object stored in the second scenario cache and (b) the first version of the first object stored in the shared cache;
   wherein the method is performed by at least one device comprising a hardware processor.

2. The method of claim 1, the method further comprising:
   computing a third alternate plan corresponding to a third scenario, wherein computing the third alternate plan comprises executing the instructions referencing the first object and the second object at least by:
      determining that a third version of the second object is stored in a third scenario cache, wherein versions of objects stored in the third scenario cache supersede versions of objects stored in the shared cache for computing the third alternate plan for the third scenario; and
      executing the instructions to compute the third alternate plan based on (a) the third version of the second object stored in the third scenario cache and (b) the first version of the first object stored in the shared cache.

3. The method of claim 1, wherein:
   the second object has a corresponding second object identifier;
   the first scenario cache has a first cache identifier;
   the second scenario cache has a second cache identifier different from the first cache identifier;
   determining that the second object is stored in the first scenario cache is based on the second object identifier and the first cache identifier; and
   determining that the second object is stored in the second scenario cache is based on the second object identifier and the second cache identifier.

4. The method of claim 1, the method further comprising:
   allocating a first portion of memory;
   storing the shared cache in the first portion of memory;
   allocating a second portion of memory that does not overlap the first portion of memory; and
   storing a plurality of scenario caches in the second portion of memory.

5. The method of claim 1, the method further comprising:
   allocating a first portion of memory;
   storing the shared cache in the first portion of memory;
   allocating a second portion of memory;
   storing the first scenario cache in the second portion of memory, wherein the first portion of memory does not overlap the first portion of memory;
   allocating a third portion of memory;
   storing the second scenario cache in the third portion of memory, wherein there is no overlap among the first portion, second portion, and third portions of memory.

6. The method of claim 1, the method further comprising:
   allocating a first portion of memory; and
   storing the shared cache, the first scenario cache, and the second scenario cache in the first portion of memory.

7. The method of claim 1, wherein:
   the initial plan is a plan for satisfying a plurality of service orders by selecting for each service order one or more of a set of rate offerings;
   the set of rate offerings are stored in a production database; and
   the first object and the second object are defined by one or more rate offerings.

8. The method of claim 1, the method further comprising:
   prior to initiating the computing of the first alternate plan, performing:

retrieving from a production database a first object having a production value;
storing a first version of the first object in the shared cache, the first version of the first object having the production value;
reading a first scenario specification comprising a hypothetical change to the value of the first object;
creating a second version of the first object, and applying the hypothetical change to the value of the second version of the first object as specified by the first scenario specification;
storing the second version of the first object in the first scenario cache.

9. The method of claim 1, wherein determining that a second version of the first object is stored in a first scenario cache further comprises:
determining that the first object is in a list of registered objects for the first scenario;
determining that the first object is not yet in the first scenario cache;
retrieving a first version of the first object having a production value;
creating a copy of the first version of the first object;
applying a hypothetical change to the value of the copy of the first object, as specified by the first scenario specification; and
storing in the first scenario cache the copy of the first object with a changed value as the second version of the first object.

10. The method of claim 1, wherein:
the initial plan is a plan for satisfying a plurality of service orders by selecting for each service order one or more of a set of rate offerings;
the set of rate offerings are stored in a production database; and
the first object and the second object are defined by one or more a rate offerings;
the first object has a corresponding first object identifier, and the second object has a corresponding second object identifier; and
the method further comprising:
allocating a first portion of memory;
storing the shared cache in the first portion of memory;
allocating a second portion of memory that does not overlap the first portion of memory;
storing a plurality of scenario caches in the second portion of memory, wherein:
the first scenario cache has a first cache identifier;
the second scenario cache has a second cache identifier different from the first cache identifier;
determining that the second object is stored in the first scenario cache is based on the second object identifier and the first cache identifier; and
determining that the second object is stored in the second scenario cache is based on the second object identifier and the second cache identifier.
retrieving from a production database a first object having a production value;
storing a first version of the first object in the shared cache, the first version of the first object having the production value;
reading a first scenario specification comprising a hypothetical value for the first object;
creating a second version of the first object, and assigning to the second version of the first object the hypothetical value specified by the first scenario specification;
storing the second version of the first object in the first scenario cache;
computing a third alternate plan corresponding to a third scenario, wherein computing the third alternate plan comprises executing the instructions referencing the first object and the second object at least by:
determining that a third version of the second object is stored in a third scenario cache, wherein versions of objects stored in the third scenario cache supersede versions of objects stored in the shared cache for computing the third alternate plan for the third scenario; and
executing the instructions to compute the third alternate plan based on (a) the third version of the second object stored in the third scenario cache and (b) the first version of the first object stored in the shared cache;
wherein the method is performed by at least one device comprising a hardware processor.

11. A system comprising:
at least one hardware device including a processor; and
the system configured to perform operations comprising:
computing an initial plan using objects stored in a shared cache, wherein computing the initial plan comprises executing instructions referencing a first object and a second object, wherein the instructions are executed based on (a) a first version of the first object and (b) a first version of the second object stored in the shared cache;
computing a first alternate plan corresponding to a first scenario, wherein computing the first alternate plan comprises executing the instructions referencing the first object and the second object at least by:
determining that a second version of the first object is stored in a first scenario cache, wherein versions of objects stored in the first scenario cache supersede versions of objects stored in the shared cache for computing the first alternative plan for the first scenario;
determining that no version of the second object is stored in the first scenario cache; and
executing the instructions to compute the first alternate plan based on (a) the second version of the first object stored in the first scenario cache and (b) the first version of the second object stored in the shared cache;
computing a second alternate plan corresponding to a second scenario, wherein computing the second alternate plan comprises executing the instructions referencing the first object and the second object at least by:
determining that a second version of the second object is stored in a second scenario cache, wherein versions of objects stored in the second scenario cache supersede versions of objects stored in the shared cache for computing the second alternate plan for the second scenario; and
executing the instructions to compute the second alternate plan based on (a) the second version of the second object stored in the second scenario cache and (b) the first version of the first object stored in the shared cache.

12. One or more non-transitory machine-readable media storing instructions which, when executed by one or more processors, cause:
computing an initial plan using objects stored in a shared cache, wherein computing the initial plan comprises executing instructions referencing a first object and a second object, wherein the instructions are executed based on (a) a first version of the first object and (b) a first version of the second object stored in the shared cache;

computing a first alternate plan corresponding to a first scenario, wherein computing the first alternate plan comprises executing the instructions referencing the first object and the second object at least by:
- determining that a second version of the first object is stored in a first scenario cache, wherein versions of objects stored in the first scenario cache supersede versions of objects stored in the shared cache for computing the first alternative plan for the first scenario;
- determining that no version of the second object is stored in the first scenario cache; and
- executing the instructions to compute the first alternate plan based on (a) the second version of the first object stored in the first scenario cache and (b) the first version of the second object stored in the shared cache;

computing a second alternate plan corresponding to a second scenario, wherein computing the second alternate plan comprises executing the instructions referencing the first object and the second object at least by:
- determining that a second version of the second object is stored in a second scenario cache, wherein versions of objects stored in the second scenario cache supersede versions of objects stored in the shared cache for computing the second alternate plan for the second scenario; and
- executing the instructions to compute the second alternate plan based on (a) the second version of the second object stored in the second scenario cache and (b) the first version of the first object stored in the shared cache.

\* \* \* \* \*